(12) United States Patent
Tu

(10) Patent No.: US 6,581,818 B1
(45) Date of Patent: Jun. 24, 2003

(54) TROUGH DEVICE IN A SOLDERING FURNACE

(76) Inventor: Yu-Chen Tu, No. 3, Din Hu 7$^{th}$ St., Kuei Shan Hsiang, Taoyuan (TW)

(*) Notice: Subject to any disclaimer, the term of this patent is extended or adjusted under 35 U.S.C. 154(b) by 11 days.

(21) Appl. No.: 10/033,884

(22) Filed: Dec. 27, 2001

(51) Int. Cl.$^7$ .............................. B23K 1/08; B23K 3/06
(52) U.S. Cl. ....................................... 228/37; 228/56.1
(58) Field of Search ............................. 228/260, 33, 37, 228/56.1, 256

(56) References Cited

U.S. PATENT DOCUMENTS

| | | | | |
|---|---|---|---|---|
| 3,668,713 A | * | 6/1972 | Baker | 4/512 |
| 3,765,591 A | * | 10/1973 | Cook | 228/36 |
| 4,011,980 A | * | 3/1977 | Dvorak et al. | 228/180.1 |
| 4,256,252 A | * | 3/1981 | Huppunen et al. | 228/56.2 |
| 4,545,520 A | * | 10/1985 | Kent | 228/180.1 |
| 4,616,775 A | * | 10/1986 | Simonetti | 228/37 |
| 5,148,961 A | * | 9/1992 | Humbert et al. | 228/37 |
| 5,203,489 A | * | 4/1993 | Gileta et al. | 228/219 |
| 5,411,197 A | * | 5/1995 | Nakamura et al. | 228/34 |

* cited by examiner

*Primary Examiner*—Tom Dunn
*Assistant Examiner*—Kiley Stoner
(74) *Attorney, Agent, or Firm*—Connolly Bove Lodge & Hutz, LLP

(57) ABSTRACT

A trough device in a soldering furnace comprises a motor, a soldering pot, support device, a trough part and transmission device. The support device connects with a fixing base of the motor via a micro adjustment device and an inclinometer for adjusting an inclining angle of the soldering pot and informing the adjusted inclining angle. A guidance part with double layer structure is located at the soldering pot and can receive the solder oxide residue falling down from the circuit board or spattered out from the soldering pot to prevent the solder oxide residue from flowing back to the trough part. The transmission device further comprises a transmission shaft, a shaft hub, a fan blade part and fixing plate assembly. The shaft hub surrounds the transmission shaft with bearings being disposed between the shaft hub and the transmission shaft. The fixing plate assembly is arranged at the lower end of the shaft hub and engages with the soldering pot by way of screw threads. The transmission shaft, the shaft hub, the fan blade part, and the fixing plate assembly can be fixed coaxially with being firmly supported by the shaft hub. Hence, the transmission shaft can rotates more steadily and the component parts thereof can be free from being contaminated by the tin solder.

10 Claims, 14 Drawing Sheets

TROUGH DEVICE IN A SOLDERING FURNACE

BACKGROUND OF THE INVENTION

1. Field of the Invention

The present invention relates to a trough device in a soldering furnace, and particularly to a trough device, which is disposed in a soldering furnace and is attached with a soldering pot in conjunction with a transmission device so as to enhance the soldering job on a circuit board.

2. Description of Related Art

Referring to FIGS. 1 to 3, a trough device A in a conventional soldering furnace comprises a transmission shaft A1, a soldering pot A2, a screen plate A3, a guidance part A4, a fan blade part A5, a trough part A6, and a motor A7. The transmission device A1 provides a support frame A11 to hold the transmission shaft A1 and the transmission shaft passes through the fan blade part A5 to engage with the bottom of the soldering pot A2 by way of a nut A12. A transmission belt A71 is disposed between to connect with the transmission shaft A1 and the motor A7 so that the transmission shaft A1 can be driven by the motor A7. The tin solder in the trough part A6 is heated up by the heater A61 and is melted into liquid tin solder. Then, the liquid tin solder is sent to the screen plate A3 through the soldering pot A2 by the traction of the fan blade part A5 and reaches to the guidance part A4. Finally, the liquid tin solder overflows the guidance part A4 to perform the soldering job on a circuit board B. The conventional device has the following shortcomings:

1. The circuit board B moves forward with an inclining angle D of 3~7° as shown in FIG. 3, however, the tin solder overflows the guidance part A4 horizontally and only a small part of area on the circuit board B touches the tin solder such that it results in an uneven soldered surface on the circuit board B.

2. Although the working table carrying the circuit board B can be adjusted to have a higher elevation for shortening the distance between the circuit board and the guidance part A4, it is required to consider if the working table van be kept flat after the working table being adjusted. An improper adjustment for the working table may cause an uneven soldered surface on the circuit board and it is easy to become short circuit. Further, it is much tedious if the working table is raised the height thereof.

3. The fan blade part A5 usually provides a high rotational speed and it is insufficient for the support frame A1 with the nut A12 to hold the transmission shaft A1 and the fan blade part A5. Hence, the axis of the transmission shaft A1 may become deviated and the fan blade part A5 may become loosely after a period of running.

4. The components of the transmission device are arranged to expose to the outside and the tin solder is sprayed with a very high speed so that it is easy for the tin solder to stay in the clearances between the components and the life span of components may be shortened.

5. The transmission device is hard to be set up or detached so that it is not favorable for the maintenance work.

SUMMARY OF THE INVENTION

A trough device in a soldering furnace according to the present invention comprises a motor, a soldering pot, support device, a trough part and transmission device. The support device connects with a fixing base of the motor via a micro adjustment device and an inclinometer for adjusting an inclining angle of the soldering pot and informing the adjusted inclining angle. A guidance part with double layer structure is located at the soldering pot and can receive the tin oxide residue falling down from the circuit board or spattered out from the soldering pot to prevent the oxide tin residue from flowing back to the trough part. The transmission device further comprises a transmission shaft, a shaft hub, a fan blade part and fixing plate assembly. The shaft hub surrounds the transmission shaft with bearings being disposed between the shaft hub and the transmission shaft. The fixing plate assembly is arranged at the lower end of the shaft hub and engages with the soldering pot by way of screw threads. The transmission shaft, the shaft hub, the fan blade part, and the fixing plate assembly can be fixed coaxially with being supported firmly by the shaft hub and the fixing plate assembly so that the transmission shaft can rotate more steadily and the components in the transmission device can be free from being contaminated by the tin solder.

A primary object of the present invention provides a trough device in a soldering furnace, in which the soldering pot can be turned an inclining angle to the right and the reversed directions with a support device so that the timing of the tin solder overflowing the guidance part can be extended from the solder disengaging point of the circuit board to the solder wave. Hence, it is not possible for the pin legs on the circuit board to connect with each other so that it is unable to result in short circuit.

Another object of the present invention provides a trough device in a soldering furnace, in which the guidance part thereof may have an output adjustable plate to adjust the amount of tin solder flowing out from the guidance part properly so as to expand the contact area of the circuit board more evenly.

A further object of the present invention provides a trough device in a soldering furnace, in which a micro adjustment device and a inclinometer can indicate the inclining angle of the soldering pot automatically.

A further object of the present invention provides a trough device in soldering furnace, in which the guidance part has a double layer structure to refrain the oxide tin solder from flowing back.

A further object of the present invention provides a trough device soldering furnace, in which the transmission shaft is surrounded by a shaft hub and is fixed to a fixing plate assembly at the lower end thereof so that the transmission shaft can rotate more steadily with support of the shaft hub and the fixing plate assembly.

A further object of the present invention provides a trough device in a soldering furnace, in which the transmission shaft is surrounded by a shaft hub to avoid the tin solder staining the transmission shaft and other components so as to prolong the life span of the trough device.

A further object of present invention provides a trough device in the soldering furnace, which is simple for maintenance.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
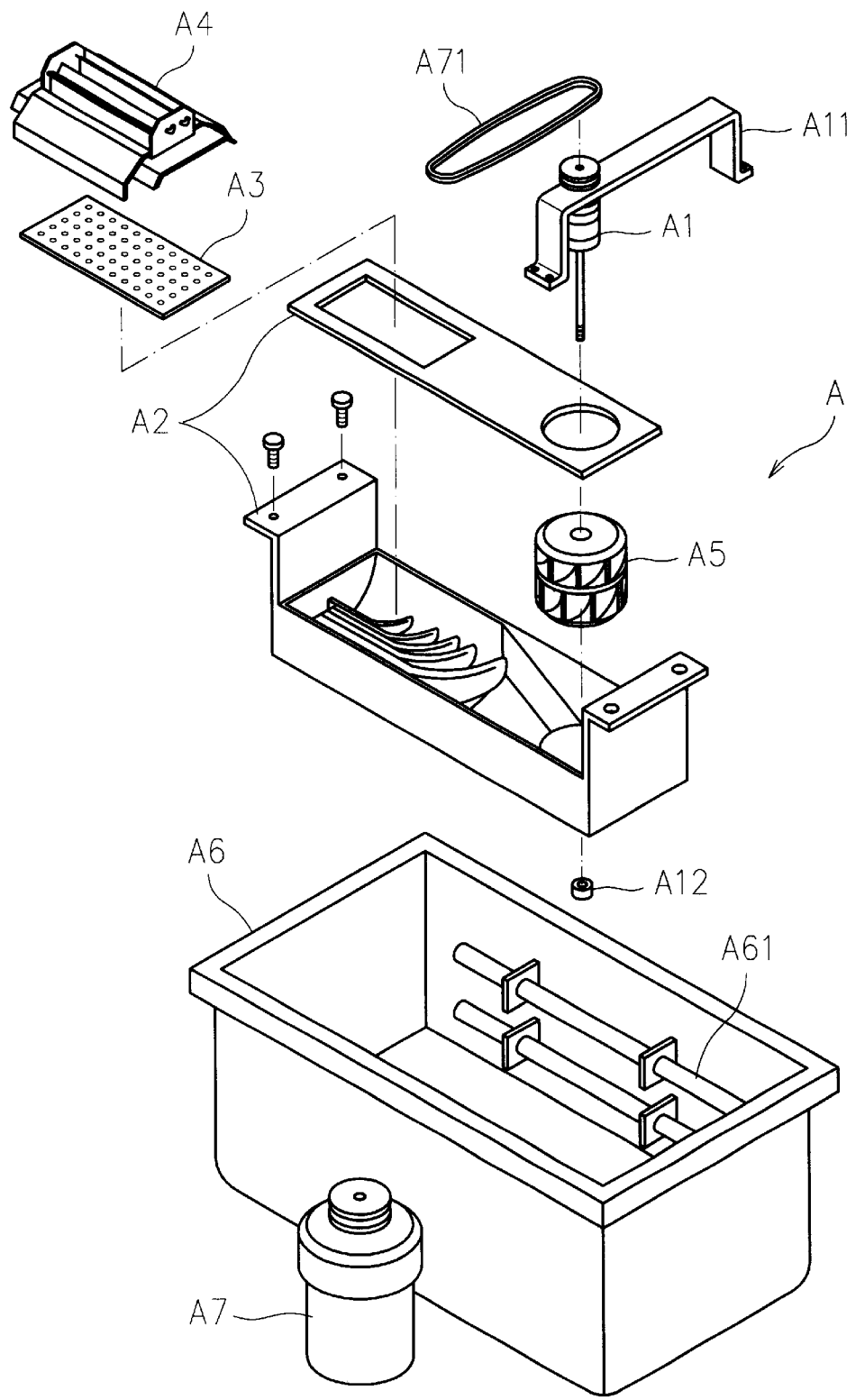
FIG. 1 is an exploded perspective view of a conventional trough device in a soldering furnace.
Figure 2:
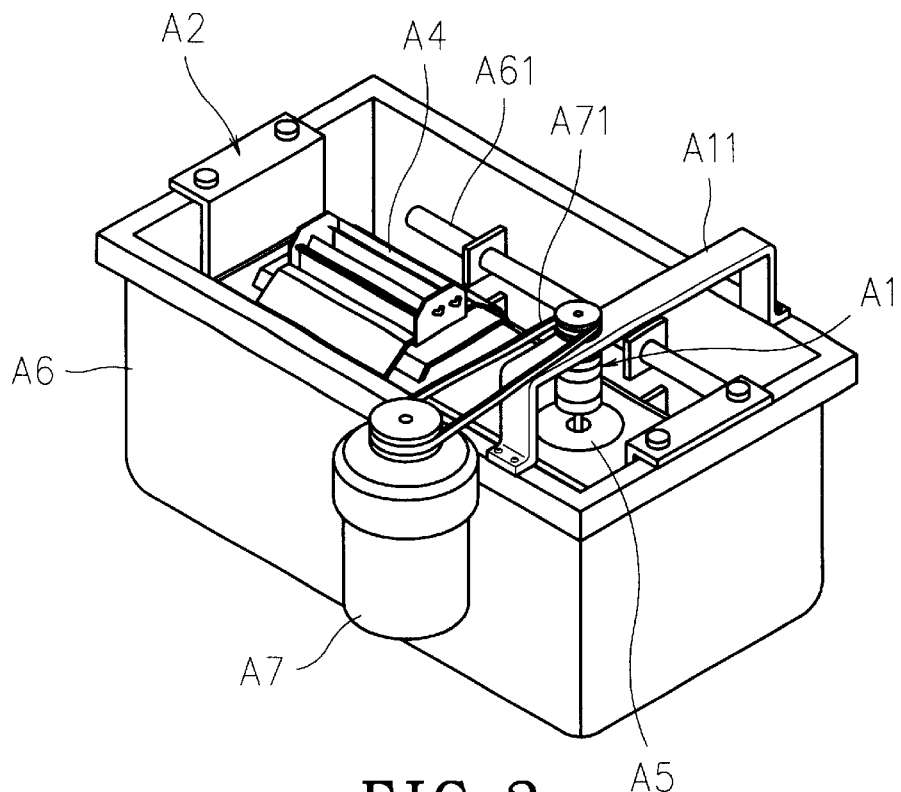
FIG. 2 is an assembled perspective view of the trough device shown in FIG. 1.
Figure 3:
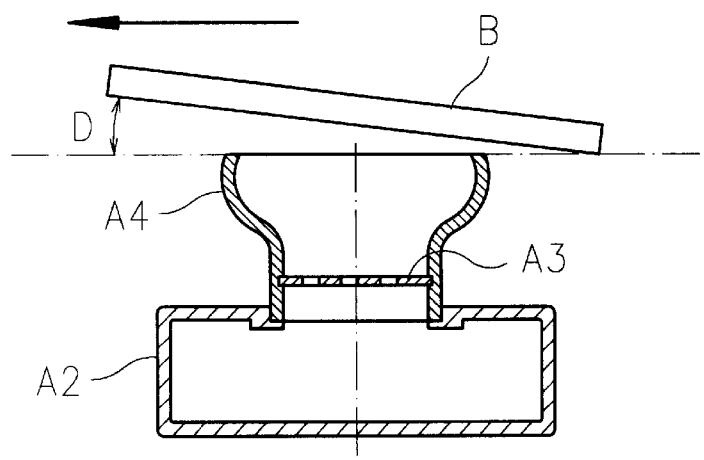
FIG. 3 is a sectional view of a soldering pot in the conventional trough device illustrating a circuit board being delivered forward over the soldering pot.
Figure 4:
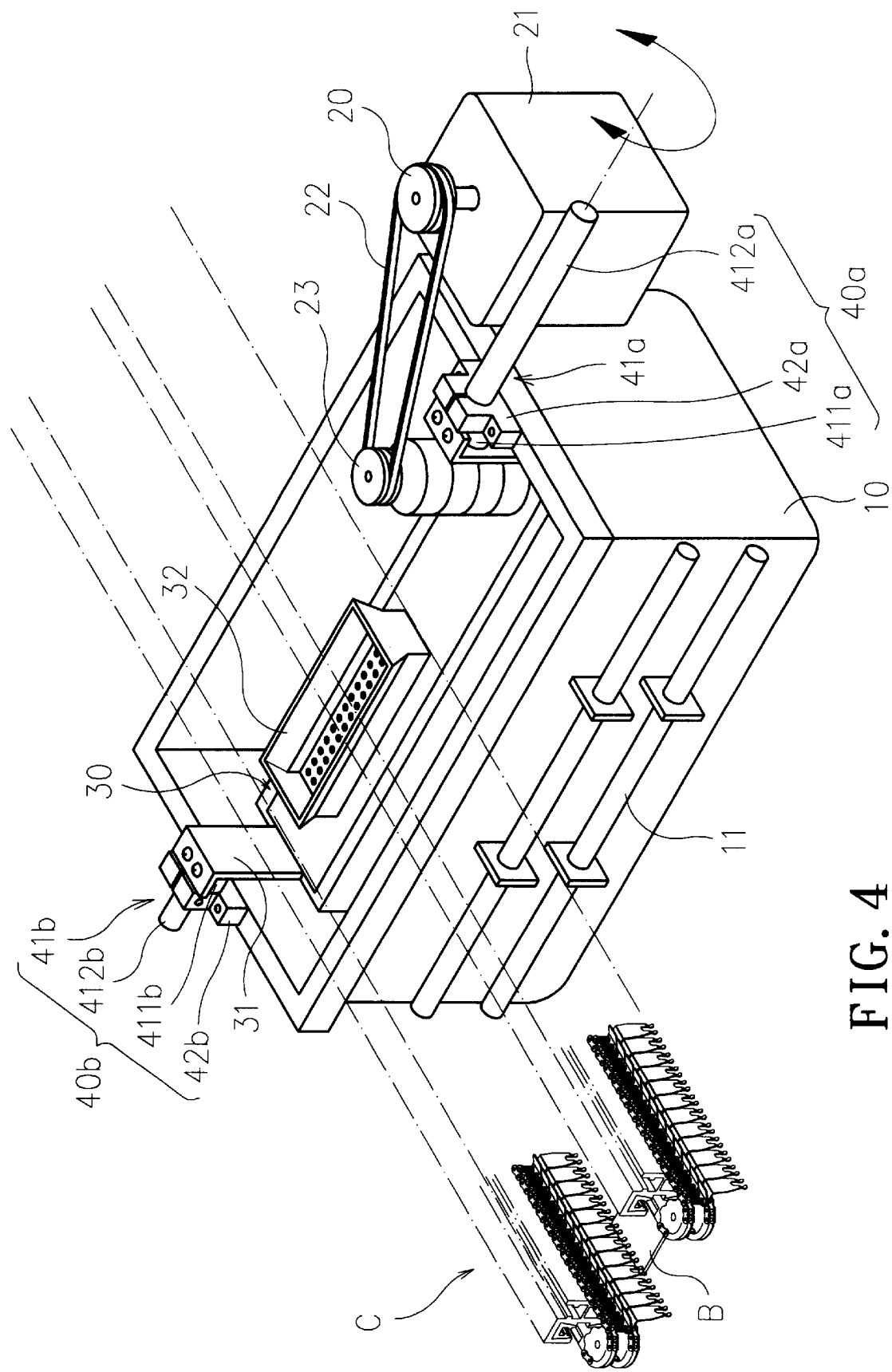
FIG. 4 is an assembled perspective view of a trough device in a soldering furnace according to the present invention.
Figure 5:
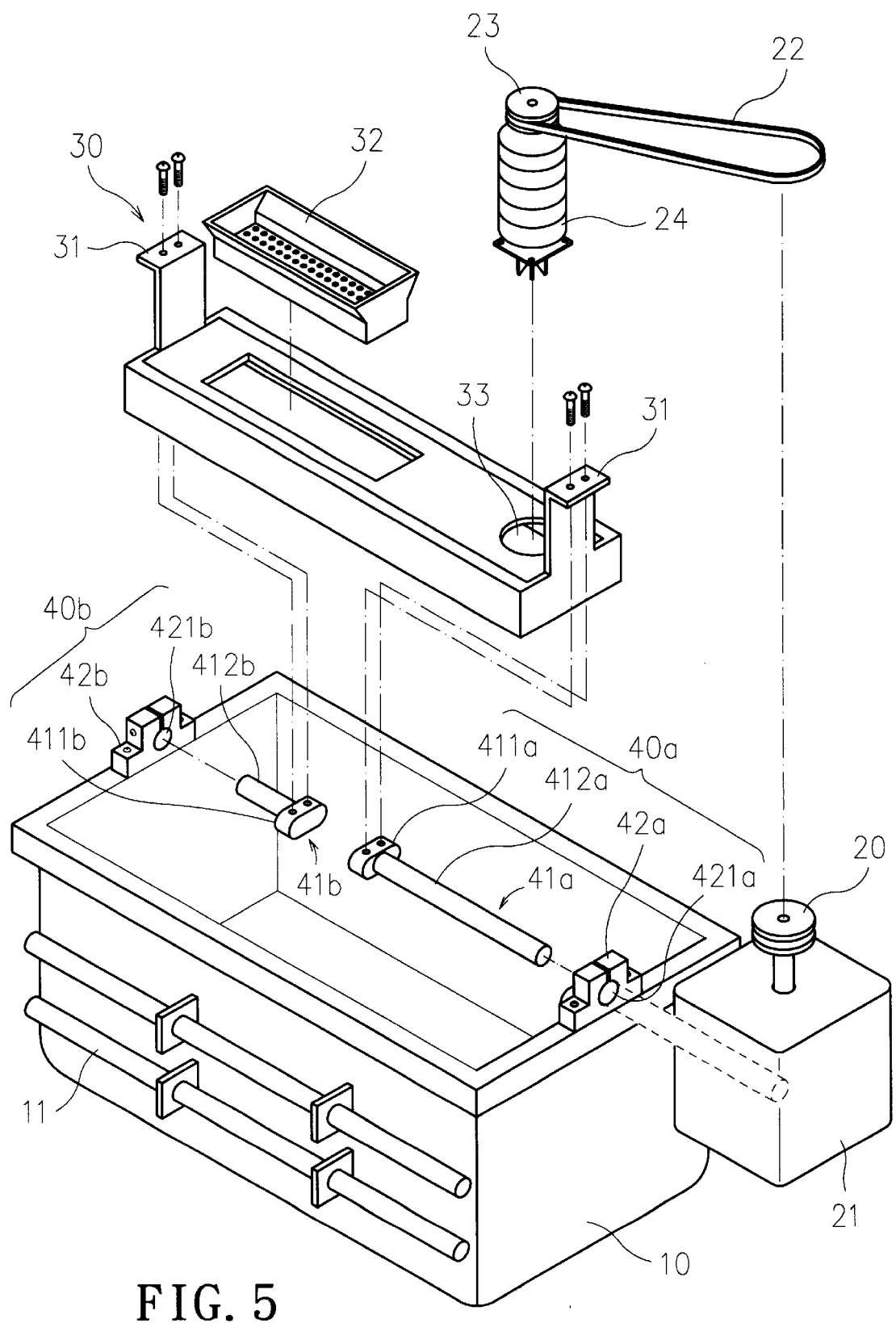
FIG. 5 is a disassembled perspective view of the trough device shown in FIG. 4.

Referring to FIGS. 4 and 5, a trough device in a soldering furnace according to the present invention in a first embodiment thereof mainly comprises a motor 20, a soldering pot 30, two support devices 40a, 40b, and a trough part 10.

The motor 20 is fixedly mounted in a fixing base 21 and drives a transmission shaft 23 with a fan blade part 24 attached to a lower end of the transmission shaft 23 via a transmission belt 22 such that the fan blade part 24 can rotate with the transmission shaft 23 as soon as the motor 20 starts to run.

The soldering pot 30 extends upward a respective fixing arm 31 from two opposite short sides thereof with an opening being provided on the top thereof near one of the short sides for mounting a guidance part 32 and another opening 33 being provided on the top thereof near the other short side for receiving the fan blade part 24 such that the transmission shaft 23 can be fixed to the soldering pot 30 through the fan blade part 24.

Each of the support device 40a, 40b is composed of a support rod 41a, 41b and a holding block 42a, 42b respectively. The support rod 41a, 41b has a fixed end 411a, 411b and a support section 412a, 412b. The holding block 42a, 42b provides a locating hole 421a, 421b so that the support section 412a, 412b of the support rod 41a, 41b can pass through the locating hole respectively.

The trough part 10 has two opposite transverse lateral walls and two opposite longitudinal lateral walls. The respective transverse wall at the upper edge thereof is attached with one of the holding block 42a, 42b respectively and the respective longitudinal lateral wall at the outer side thereof is mounted with heating pipes 11. The support section 412a can be fixedly attached to a lateral side of the fixing base 21. The fixing arms 31 on the soldering pot 30 can be fastened to the fixing ends 411a, 411b firmly by way of screw threads. Thus, the fixing base 21 of the motor 20 can rotate to incline a proper angle together with the support rods 41a, 41b and the soldering pot 30.

Figure 6:
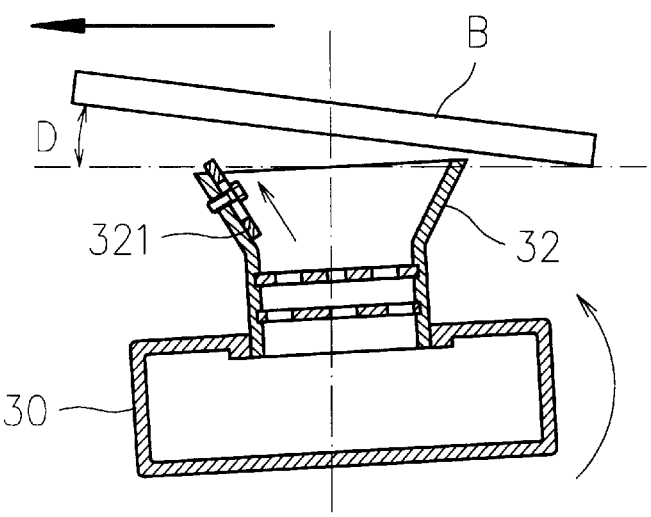
FIGS. 6 and 7 are sectional views of a soldering pot in the trough device in a soldering furnace according to the present invention illustrating two different operations of the soldering pot for a circuit board.

Referring to FIG. 6 in company with FIG. 4, the circuit board B, which is disposed at an inclining angle D of 3~7° to the horizontal plan, is delivered forward during the soldering operation. In the meantime, as soon as the fixing base 21 of the motor 2 is turned to an inclining position, the soldering pot 30 with the guidance part 32 can be turned to the same inclining angle as the fixing base 21 does. Due to the tin solder overflowing the guidance device 32 being closer to the surface of the inclining circuit board B in addition to the feature of the tin solder being able to flow downward from a high elevation, the solder disengaging point of circuit board can be extended behind the solder wave during soldering. Thus, soldered spots between two pin legs on the circuit board are not possible to connect with each other and a short circuit can be avoided. In addition, while in operation, it does not need to use great effort for the present invention as the prior art does. Furthermore, the guidance part 32 can be provided with an output adjustable plate 321 and the output adjustable plate 321 can be adjusted to move upward or downward according to the inclining angle of the guidance part 32 such that the tin solder in the soldering pot 30 cannot overflow easily. Hence, a greater and more even soldering area on the circuit board can be obtained due to the disengaging point being extended behind the solder wave. In this way, the soldering effect and the soldering quality can be enhanced substantially.

Figure 7:
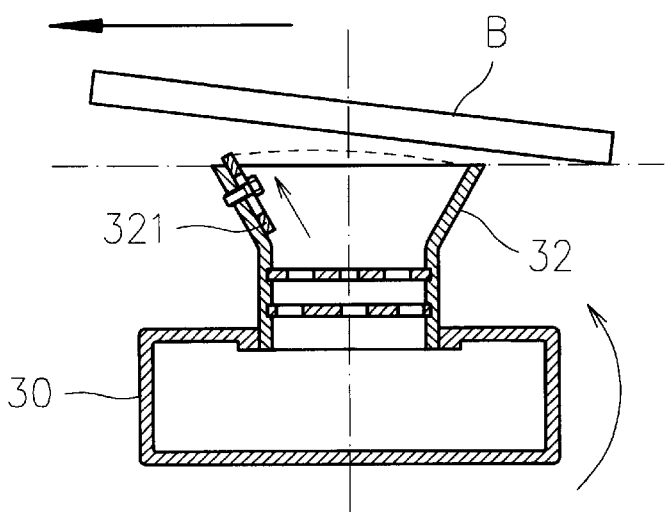

Referring to FIG. 7, it is possible to keep the guidance part 32 in a state of not being rotated an inclining angle during soldering and it is only necessary to move the output adjustable plate 321 upward. This is another way for the liquid tin solder to contact with a greater area of the circuit board B by way of the surface tension of the liquid tin solder as the dash line shown in FIG. 7. Hence, a greater and more even soldering area on the circuit also can be obtained under a condition of the disengaging point being extended behind the solder wave so as to enhance the soldering effect and the soldering quality.

Figure 8:
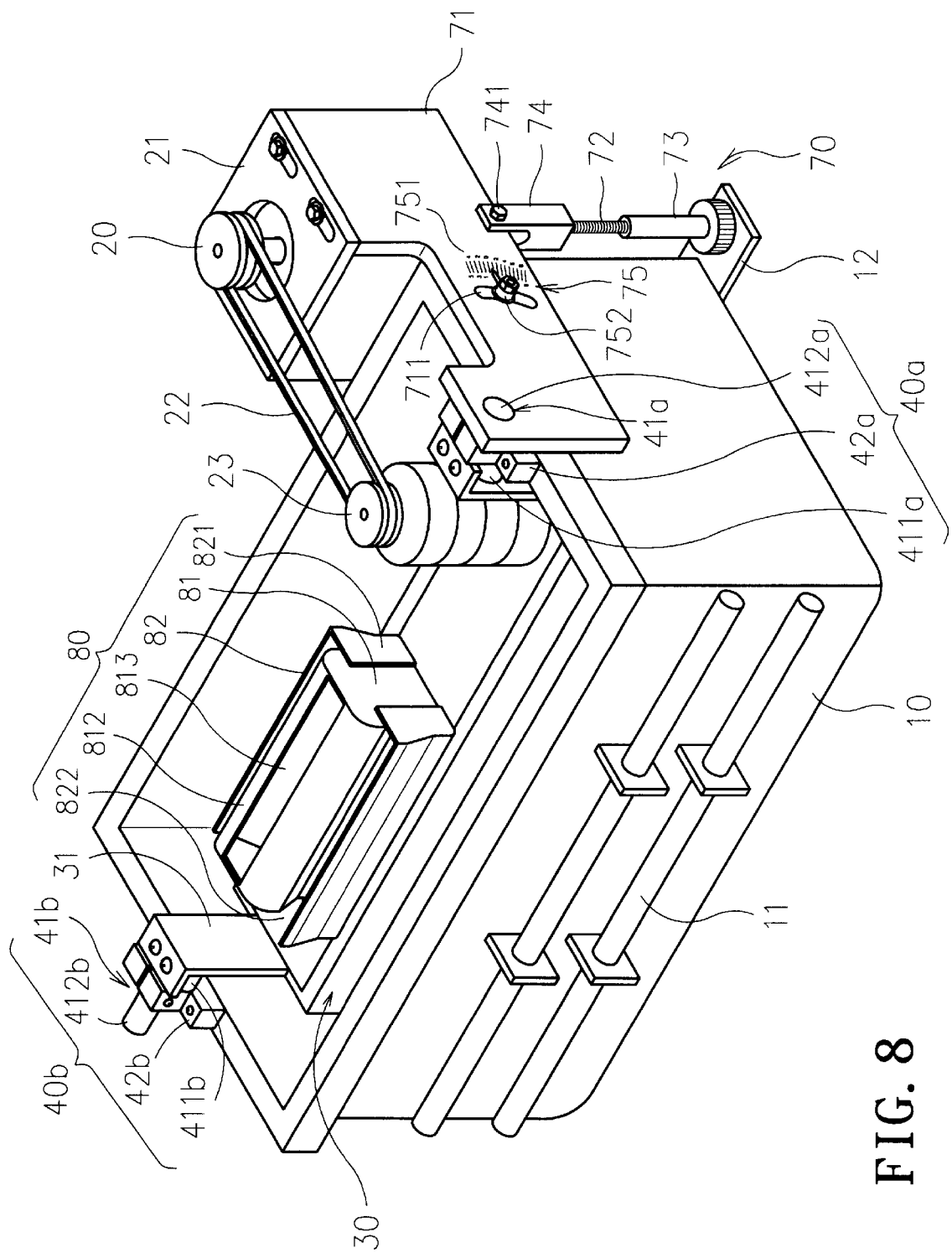
FIG. 8 is an assembled perspective view of a trough device in a soldering furnace according to the present invention in a second embodiment thereof.

Referring to FIG. 8, a second embodiment of the present invention is illustrated. The parts such as the motor 20, the soldering pot 30, the support devices 40a, 40b, the trough part 10 in the trough device of the present embodiment are identical with the first embodiment shown in FIGS. 4 and 5. The difference of the present embodiment from the first embodiment is in that a support section 412a on the support rod 41a of the support device 40a and the fixing base 21 of the motor 20 connect with a micro adjustment device 70 and the guidance part 80 is a double layer structure composed of an inner layer part 81 and an outer layer part 82.

Figure 9:
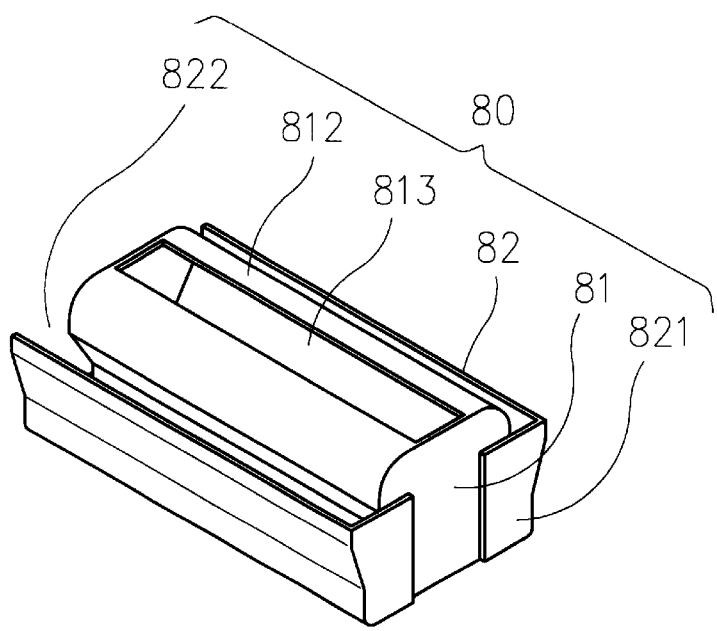
FIG. 9 is a perspective view of a guidance part in the soldering pot of the second embodiment shown in FIG. 8.
Figure 10:
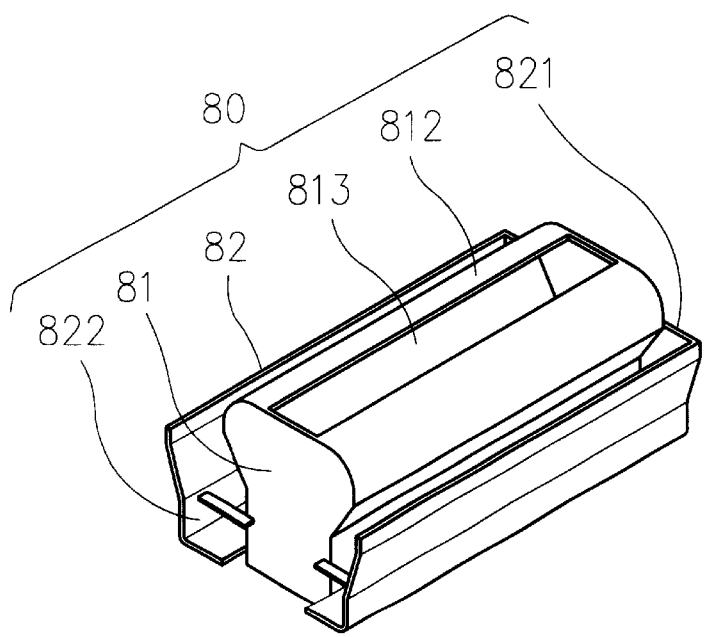
FIG. 10 is another perspective view of the guidance part shown in FIG. 8 projecting from another projection angle.
Figure 11:
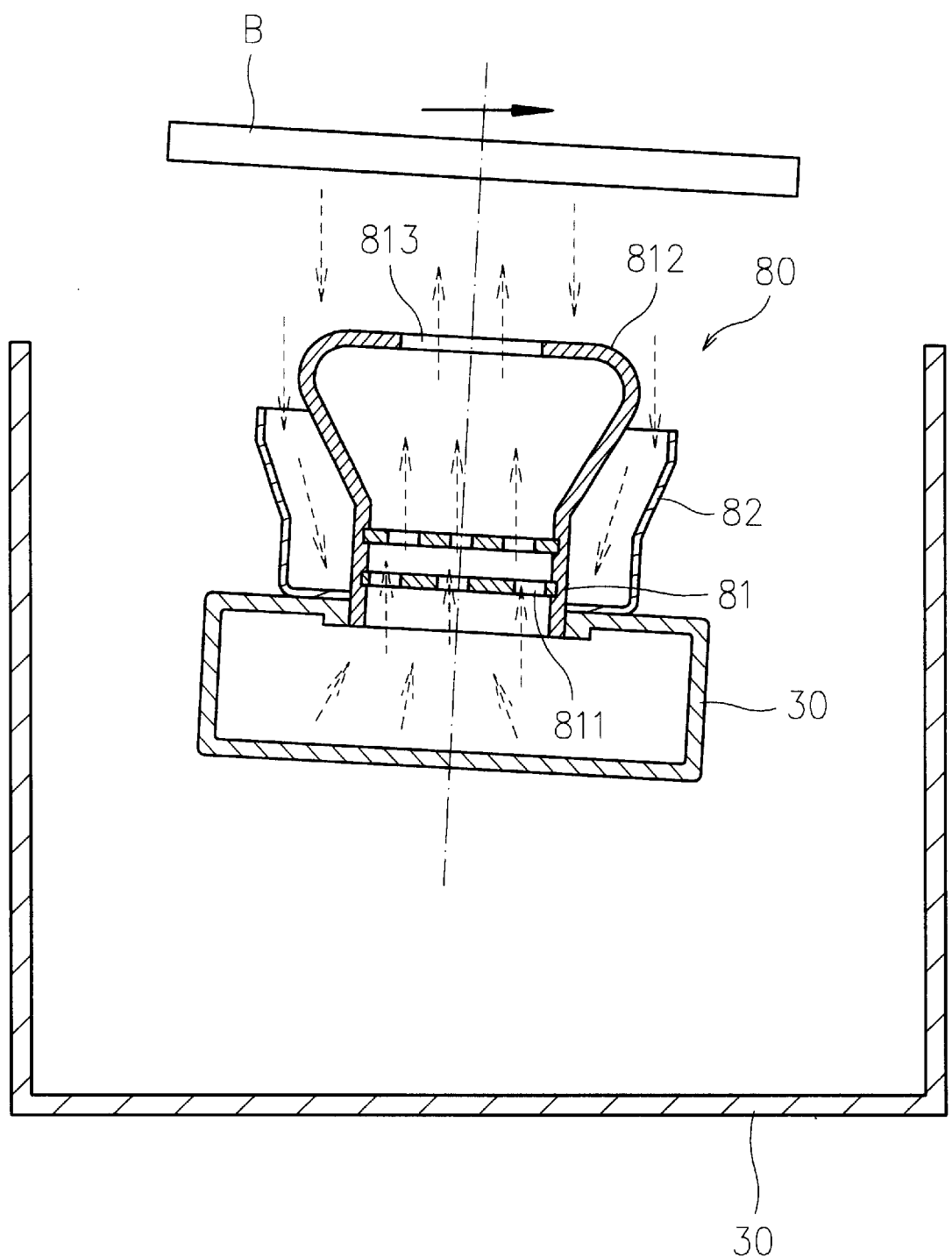
FIG. 11 is a sectional view of the soldering pot in the second embodiment of the present invention shown in FIG. 8 illustrating the operation of a circuit board being soldered.

Referring to FIGS. 9 to 11 in company with FIG. 8, the guidance part 80 is composed of an inner layer part 81 and an outer layer part 82 as the preceding description. The inner layer part 81 at a bottom thereof provides apertures 811 and at two opposite lateral sides thereof has an upper inward bend section 812 respectively with an opening top 813 disposed in between. The outer layer part 82 has a container shape with an open upper section and surrounds the inner layer part 81 with a close end 821 and an open end 822.

Referring to FIG. 11 again, the tin solder in the soldering pot 30 enters the inner layer part 81 through the apertures 811 and reaches to the circuit board B via the opening top 813 to perform the soldering operation. Because the tin solder sprays with an extremely high speed, the tin solder may more or less spatter outside the circuit board B and the guidance part 80 during soldering. The spattered out tin solder can be collected by the outer layer part 82 and the open end 822 thereof can connect with an external pipe passage (not shown) for discharging the collected tin oxide residue in the outer layer part 82.

Figure 12:
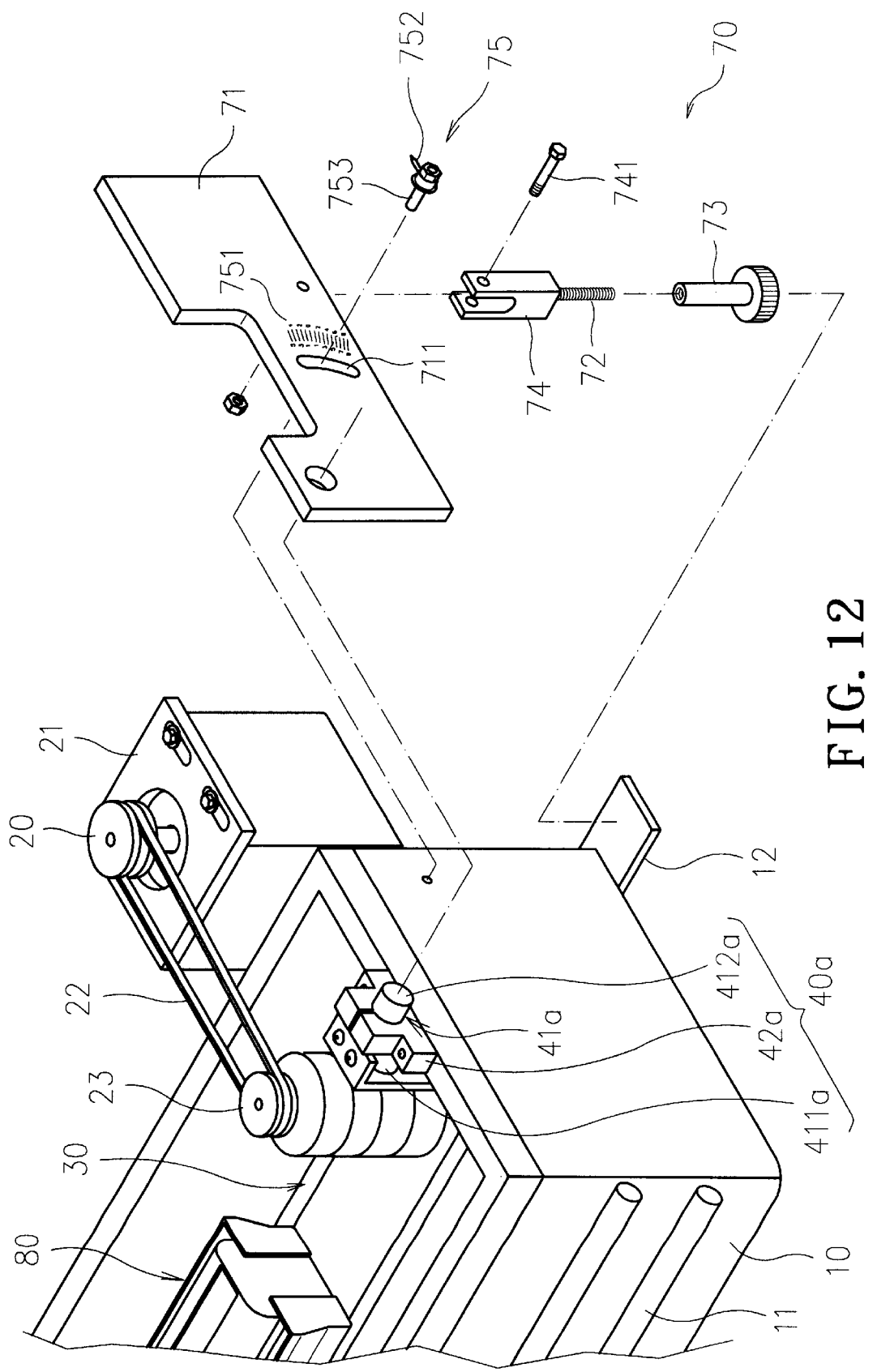
FIG. 12 is an exploded perspective view of a micro adjustment device in the second embodiment shown in FIG. 8.

Referring to FIG. 12 in company with FIG. 8 again, the micro adjustment device 70 comprises a main plate 71, a screw rod 72 and an adjustable bolt 73. The main plate 71 at a lateral side thereof is fixed to the support section 412*a* and at another lateral side thereof is fixed to the fixing base 21. The screw rod 72 at an upper end thereof provides a joint 74 pivotally connected to the lower part of the main plate 71 with a pivot 741 and at the lower end thereof engages with the adjustable bolt 73. The adjustable bolt 73 at the head part thereof keeps contact with a support plate 12 extending from the trough part 10 such that the support plate 12 is subjected to the total load of the motor 20 and the fixing base 21. It is noted that the arrangement of screw rod 72 with the adjustable bolt 73 is not for a restriction so that any other type of arrangement, with which the screw rod 72 can pivotally engage with the main plate 71 and the adjustable bolt 73 can be fixed to or disposed next to the trough part 10 for the adjustable bolt 73 being able to rotate without moving upward or downward and driving the screw rod 72, can be obtained.

A graduation scale 751 is arranged on the main plate 71 and a locating slot 711 is disposed next to the graduation scale 751 with an indicating needle 752. The indicating needle 752 is movably located at the locating slot 711 by way of a shaft 753 passing through the locating slot 711 and engaging with the trough part 10. The graduation scale 751 and the indicating needle 752 constitute an inclinometer 75.

Figure 13:
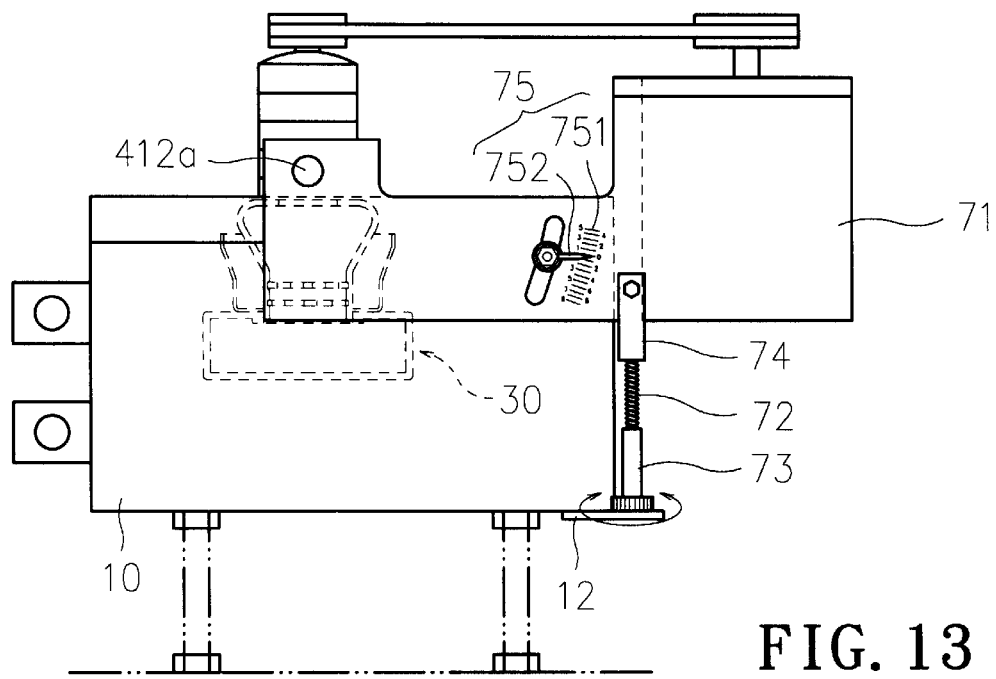
FIG. 13 is a side view of the soldering furnace of the second embodiment of the present invention shown in FIG. 8 clearly showing the micro adjustable device thereof.
Figure 14:
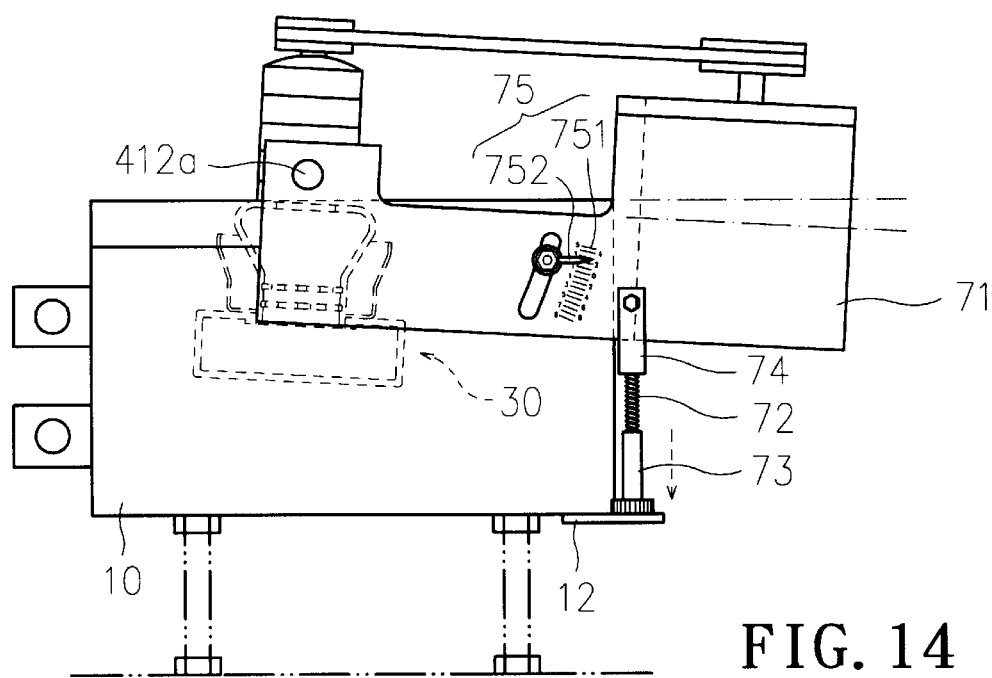
FIG. 14 is a side view similar to FIG. 13 illustrating the micro adjustable device thereof having been adjusted.

Referring to FIGS. 13 and 14, the screw rod 72 can move upward or downward as soon as the adjustable bolt 73 is turned such that the main plate 71 is pulled by the traction of the joint 74 to rotate around the axis of the support section 412*a* and adjust the inclining angle of the soldering pot 30. Because the indicating needle 752 is fixedly attached to the trough part 10, the graduation indicated by the indicating needle 752 can show the adjusted inclining angle of the soldering pot 30 automatically as soon as the main plate 71 is in a state of inclining.

Figure 15:
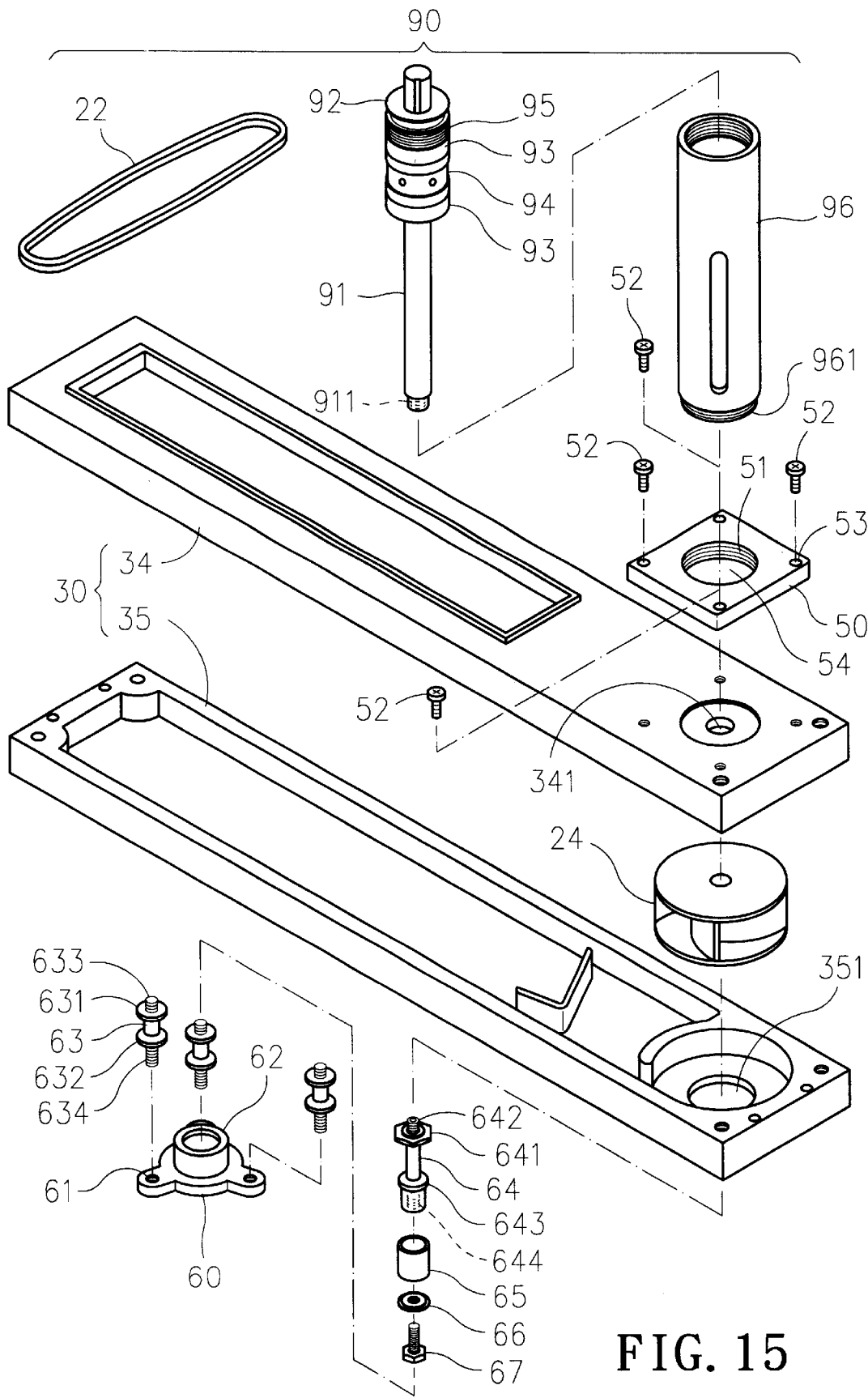
FIG. 15 is an exploded perspective view of the soldering pot with related driving parts in the soldering furnace according to the present invention in a third embodiment thereof.
Figure 16:
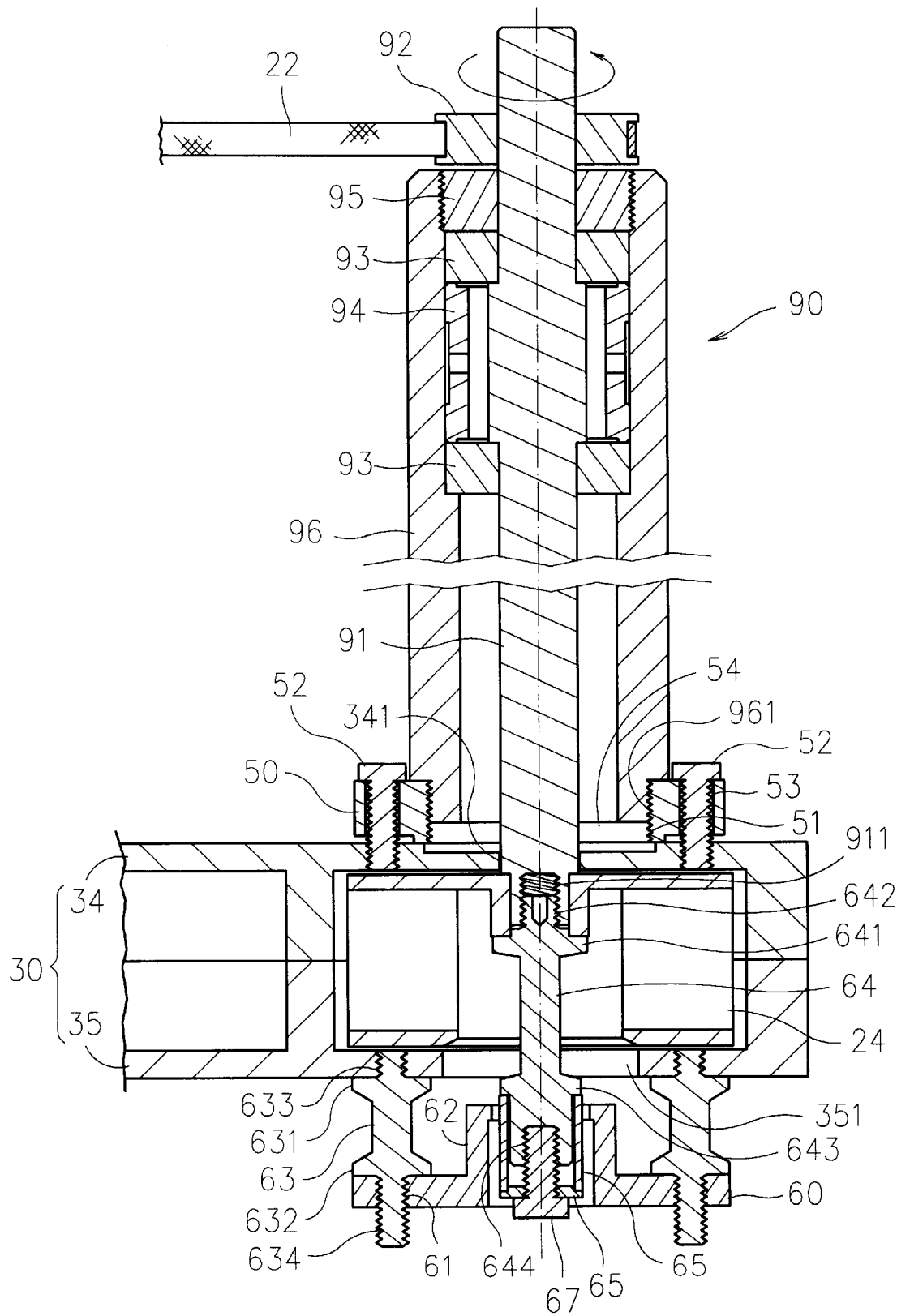
FIG. 16 is an assembled sectional view of the third embodiment shown in FIG. 15.

Referring to FIGS. 15 and 16, a transmission device in the trough device comprises a soldering pot 30, a fan blade part 24, a transmission shaft 90, a shaft hub 96 and a fixing assembly. The fixing assembly is composed of an upper fixing plate 50, a lower fixing plate 60, a plurality of support posts 63, and a stub shaft 64.

The soldering pot 30 is a hollow body composed of an upper cover 34 and a lower base 35 with an upper recess 341 being arranged at the lower side of the upper cover 34 and a lower recess 351 being arranged at the upper side of the lower base 35.

The fan blade part 24 is disposed in the space between the upper recess 341 and the lower recess 351.

The transmission shaft 91 at the lower end thereof tightly fits with the fan blade part 24 and at upper end thereof is attached with a transmission wheel 92 to join a belt 22 such that the transmission shaft 91 can be driven by way of the motor 20 (as shown in FIG. 5).

The shaft hub 96 is arranged surround the transmission shaft 91 with at least a bearing 93 being disposed between the shaft hub 96 and the transmission shaft 91. It can be seen in FIGS. 15 and 16 that two bearings 93 are provided and a sleeve 94 is located between the two bearings 93. Further, a cover cap 95 is disposed between the shaft hub 96 and the transmission shaft 91 and is fastened to the upper end of the shaft hub 96.

The upper fixing plate 50 with a central threaded hole 54 is disposed at the lower threaded end 961 of the shaft hub 96 with a plurality of engaging holes 53 next to the periphery thereof for being fastened to the upper cover 34 of the soldering pot 30 by way of bolts 52. Further, the shaft hub 96 can be fastened to the upper fixing plate 50 in a way of the lower threaded end 961 engaging with the internal screw threads 51 in the threaded hole 54.

The lower fixing plate 60 at the periphery thereof provides a plurality of threaded holes 61 attached with a central bushing 62. It can be seen in FIG. 15 that the threaded holes 61 thereof are equally spaced apart circumferentially.

Each of the support posts 63 at the middle section there of has two flanges 631, 632 spacing a part with a distance and two end parts thereof are threaded ends 633, 634. The threaded end 634 engages with the lower fixing plate 60 and the threaded end 633 engages with the lower base 35 of the soldering pot 30.

The stub shaft 64 is disposed in the busing 62 on the lower fixing plate 60 and the upper end of the stub shaft 64 has a threaded end 642 with an upper flange 641 for engaging with a threaded hole 911 at the lower end of the transmission shaft 91. The stub shaft 64 at the lower end thereof has an inner threaded end 644 with a lower flange 643 so that a cylindrical hub 65 with a lower cap 66 can be attached to the stub shaft 64 against the lower flange 643 by way of a bolt 67 engaging with the inner threaded end 642 and the lower cap 66.

Figure 17:
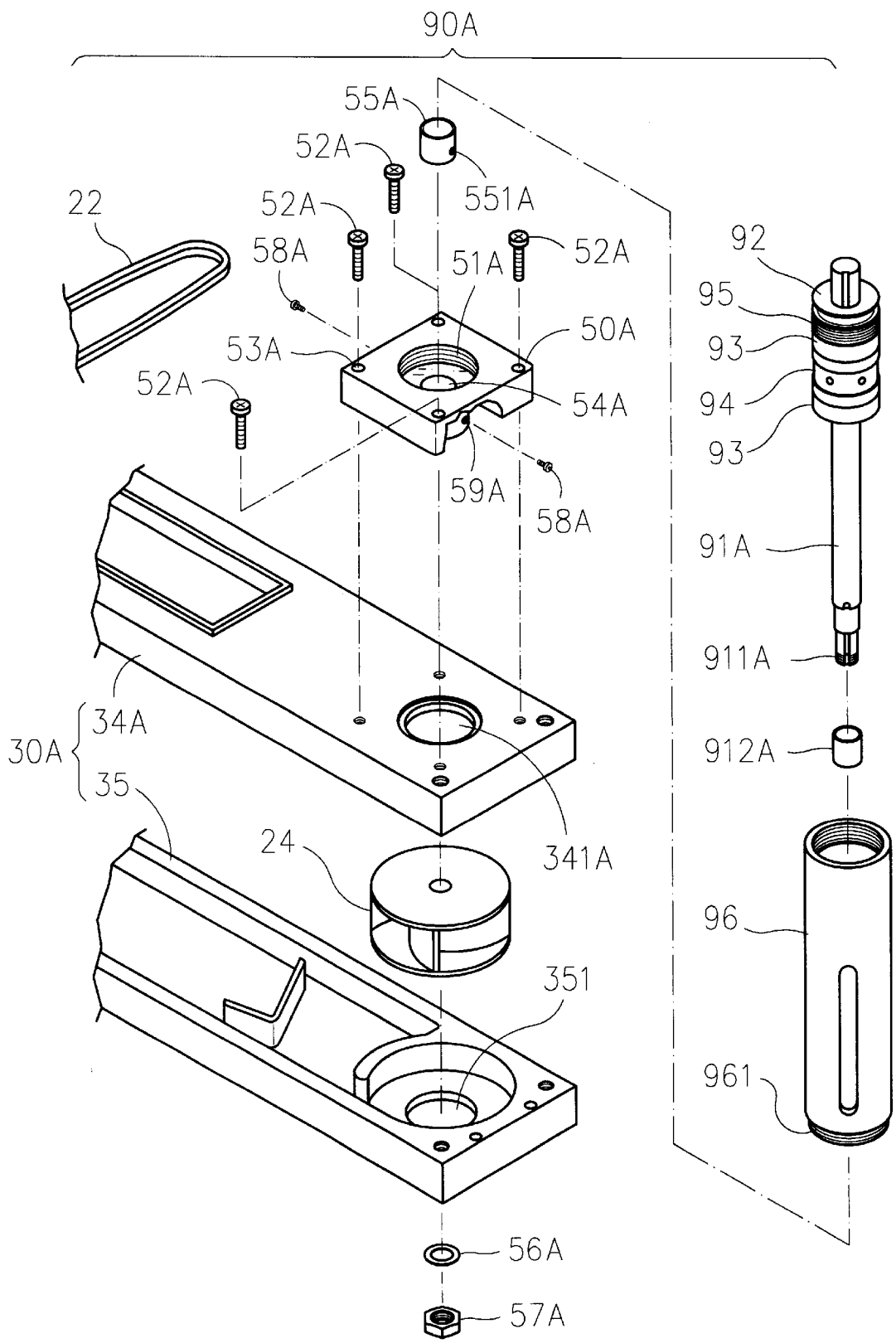
FIG. 17 is an exploded perspective view of the soldering pot with related driving parts according to the present invention in a fourth embodiment thereof.
Figure 18:
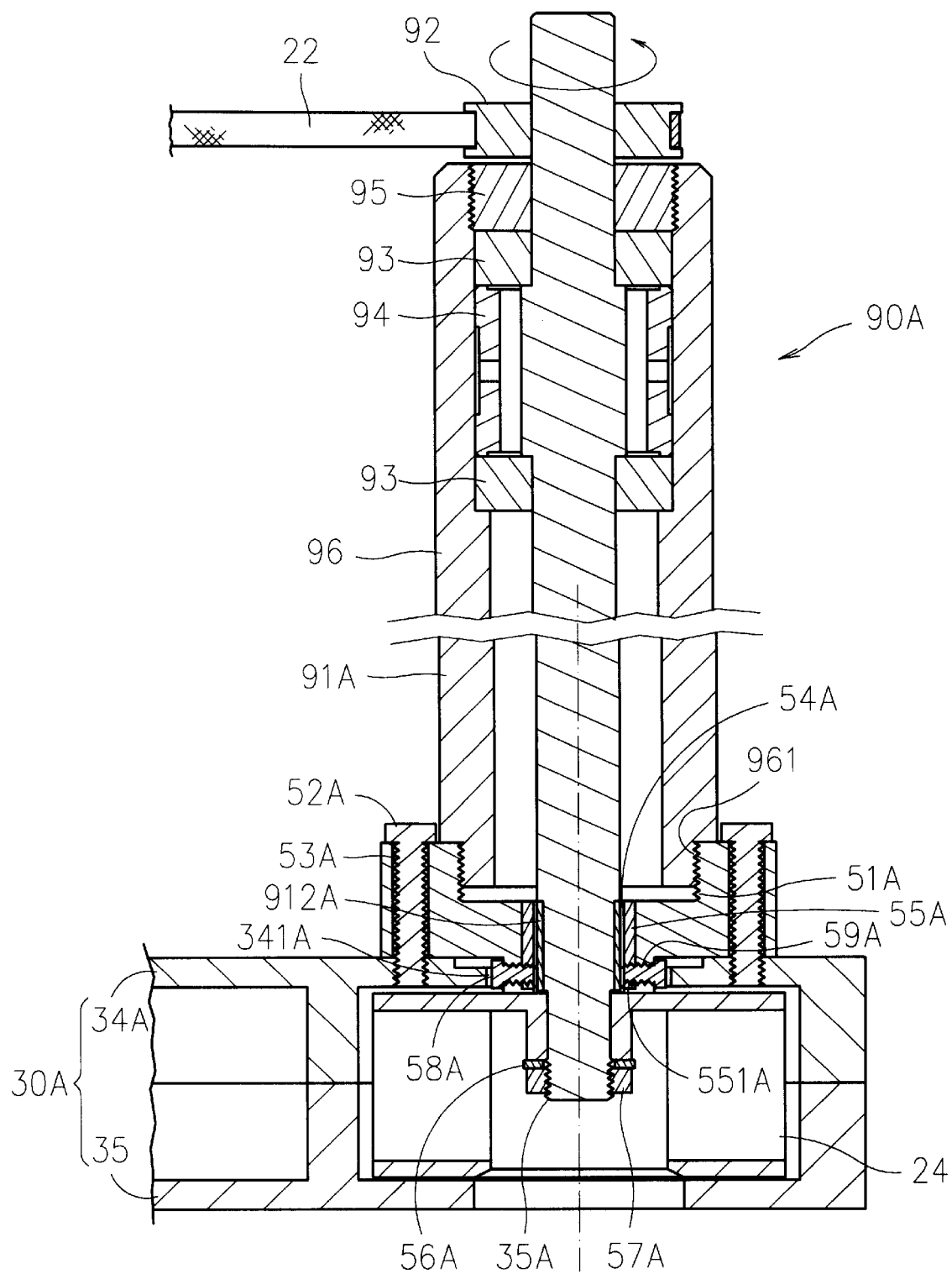
FIG. 18 is a sectional view illustrating the soldering pot with related driving parts in the soldering furnace of the fourth embodiment shown in FIG. 17 being assembled.

Referring to FIGS. 17 and 18, a further embodiment of the transmission device of the present invention is illustrated. The transmission device 90A comprises a soldering pot 30A, a fan blade part 24, a transmission shaft 91A, a shaft hub 96 and a fixing device composed of a fixing plate 50A, a bushing 55A, a sleeve 912A, a washer 56A, a nut 57A.

The soldering pot 30A is a hollow body composed of an upper cover 34A and a lower base 35 with a through opening 341A, 351 being arranged at the upper cover 34A and the lower base 35 respectively.

The fan blade part 24 is disposed between the through openings 341A, 351.

The transmission shaft 91A at the lower end thereof tightly fits with the fan blade part 24 and at upper end thereof is fixedly attached with a transmission wheel 92 to join a belt 22 so that the transmission shaft 91A can be driven with a motor (not shown).

The shaft hub 96 is arranged to surround the transmission shaft 91A with at least a bearing being disposed between the sleeve 96 and the transmission shaft 91. It can be seen in FIGS. 17 and 18 that two bearings 93 are provided and a sleeve 94 is located between the two bearings 93. Further, a cover cap 95 is disposed between the shaft hub 96 and the transmission shaft 91A and is fastened to the shaft hub 96 at the upper end thereof.

The fixing plate 50A is disposed at the lower end of the shaft hub 96 with a central sink 54A and a plurality of engaging holes 53A are arranged on the fixing plate 50A next to the periphery thereof. It can be seen in FIG. 17 that four engaging holes 53A are provided at four corners of the fixing plate 50A so that fasten the fixing plate 50A can be fastened to the upper cover 34A of the soldering pot 30A by way of bolts 52A through the engaging holes 53A. The central sink 54A provides inner screw threads 51A to engage with outer screw threads 961 at the lower end of the shaft hub 96. The fixing plate 50A at the lower central part thereof extends downward a hub with retaining holes 59A.

The bushing 55A is inserted into the sink 54A in the fixing plate 50A with engaging holes 551A through the wall thereof to align with the retaining holes 59A in the fixing plate 50A so that the bushing 55A can be fastened to the fixing plate 50A by way of bolts 58A passing through the engaging holes 551A and the retaining holes.

The bushing 912A is attached to the lower end of the transmission shaft 91A and loosely fits with the bushing 55A in the fixing plate 50A.

The nut 57A with the washer 56A engages with the screw threads 911A at lower end of the transmission shaft 91A so that the transmission shaft 91A can be in conjunction with the soldering pot 30.

It is appreciated from the foregoing that the advantages of the transmission device of the present invention can be summarized in the following with reference to FIGS. 16 and 18:

1. The transmission wheel 31, 92, the transmission shaft 91, 91A and the fan blade part 24 can be driven via the belt 22 smoothly and the transmission shaft 91, 91A can be tightly retained and supported due to the shaft hub 96 being mounted surrounding the transmission shaft 91, 91A with the sleeve 94 and the bearing 93 being mounted between the shaft hub 96 and the transmission wheel 31, 92 so that the sway of the transmission device can be avoided substantially.

2. The shaft hub 96 engages with the fixing plate 50, 50A and the fixing plate 50, 50A further engages with the upper cover 34, 34A by way of the bolts 52, 52A such that the transmission shaft 91, 91A is surrounded by the shaft hub 96 so as to protect the transmission shaft 91, 91A from being contaminated by the sprayed tin solder (not shown).

3. Because the tin solder is drawn into the soldering pot 30, 30A as soon as the fan blade part 24 is in a state of turning, the tin solder staining on the transmission shaft 91, 91A or the stub shaft 64 can be cleaned up easily as soon as the fixing plate 60 and the stub shaft 64 or the nut 57A and the washer 56A are detached.

While the invention has been described with reference to preferred embodiments thereof, it is to be understood that modifications or variations may be easily made without departing from the spirit of this invention which is defined by the appended claims.

What is claimed is:

1. A trough device in a soldering furnace, comprising:
   a motor, being disposed in and fixed to a fixing base;
   a transmission device, further comprising a transmission belt and a transmission shaft with a fan blade part, the belt connecting the motor and the transmission shaft for the motor driving the transmission shaft and the fan blade part;
   a soldering pot, being elongated with two opposite sides thereof extending outward a fixing arm respectively, having a top plate with an elongated opening and a receiving hole for locating a guidance part and the fan blade part respectively, and engaging with an end of the transmission shaft;
   at least a support device, being composed of a support rod with a fixing end and a holding block with a locating hole for engaging with the fixing arm of the soldering pot and being passed through by the support rod, and the support rod being fixedly attached to the fixing base; and
   a trough part, having two opposite transverse walls for the holding block being fixed to an upper edge of the walls respectively, and providing an outer side to be attached with heating pipes on an outer surface thereof;
   whereby, when the fixing base is turned a proper angle to a right direction or to a reversed direction, the support rod and the soldering pot can incline an angle synchronously.

2. The trough device in a soldering furnace according to claim 1, wherein the guidance part may provide an output adjustment plate.

3. The trough device in a soldering furnace according to claim 1, wherein said holding block at a top thereof is arranged a slit and a hole is disposed under the slit passage.

4. The trough device in soldering furnace according to claim 1, wherein the guidance part provides a double layer structure composed of an inner layer part and an outer layer part with the inner layer part at a bottom thereof providing apertures and two opposite lateral sides thereof having an upper inward bend section respectively with an opening top in between; the outer layer part has a container shape with an open upper section and surrounds the inner layer part; and the outer layer part has a close end and an open end with the open end connecting with an external pipe passage for discharging tin oxide residue collected in the outer layer part.

5. The trough device in a soldering furnace according to claim 1, wherein a support section is provided on the support rod and the support section and the fixing base connect with a micro adjustment device for the soldering pot being adjusted an inclining angle.

6. The trough device in a soldering furnace according to claim 5, wherein the micro adjustment device comprises a main plate, a screw rod and an adjustable bolt with the main plate at a lateral side there of being fixed to the support section and at another lateral side thereof being fixed to the fixing base such that the screw rod at an upper end thereof is pivotally attached to the lower part of the main plate and at the lower end thereof engages with the adjustable bolt fixing to the trough part; the upper end of the screw rod provides a joint to be attached to the main plate with a pivot and a lower end of the joint is fixed to the screw rod; and an inclinometer is provided on the main plate for informing an adjusted inclining angle of the soldering pot with facility; whereby as soon as the main plate being rotated around the axis of the support section, the soldering pot can be adjusted an inclining angle.

7. The trough device in a soldering furnace according to claim 6, wherein the inclinometer is composed of a graduation scale and an indicating needle; and the graduation scale is provided on the main plate with a locating slot being disposed next to the graduation scale and the indicating needle being located at the locating slot in a way of having a clearance between the indicating needle and the locating slot and fixedly attached to the trough part by way of a fastener passing through the locating slot.

8. The trough device in a soldering furnace according to claim 1, wherein the soldering pot is a hollow body composed of an upper cover and a lower base with a through opening being arranged at the upper cover and the lower base respectively, and the through holes corresponding to each other.

9. The trough device in a soldering furnace according to claim 1, wherein the transmission device comprises:

a shaft hub, being arranged to surround the transmission shaft with at least a bearing being disposed between the shaft hub and the transmission shaft;

an upper fixing plate with a central threaded hole, being disposed at a lower end of the shaft hub with a plurality of engaging holes surrounding the central threaded hole thereof for being fastened to the upper cover of the soldering pot by way of bolts, and being fastened to the shaft hub by way of screw thread engagement;

a lower fixing plate, providing a plurality of threaded holes at the periphery thereof and being attached with a central bushing;

a plurality of support posts, each of the support posts having two flanges spacing apart a distance with two threaded ends and one of threaded end engaging with the lower fixing plate and the other threaded end engaging with the lower base of the soldering pot; and a stub shaft, being disposed in the bushing of the lower fixing plate, having a threaded end with an upper flange at the upper end of the stub shaft for engaging with a threaded hole provided at the lower end of the transmission shaft, having an inner threaded end with a lower flange at a lower end thereof, being attached with a cylindrical hub and a lower cap against the lower flange by way of a bolt engaging with the inner threaded end and the lower cap;

whereby, the transmission shaft, the shaft hub, the fan blade part, and the stub shaft can be assembled coaxially and are firmly supported by the shaft hub, the upper fixing plate and the lower fixing plate such that the transmission shaft can perform a more steady rotation.

10. The trough device in a soldering furnace according to claim 1, wherein the transmission device further comprises:

a shaft hub, being arranged to surround the transmission shaft with at least a bearing being disposed between the shaft hub and the transmission shaft;

a fixing plate with a central sink, being disposed at a lower end of the shaft hub with a plurality of engaging holes surrounding the central threaded hole thereof for being fastened to the upper cover of the soldering pot by way of bolts, and engaging with the shaft hub by way of screw threads;

a fixing plate bushing, being inserted into the sink in the fixing plate and being fastened to the fixing plate by way of bolts;

a shaft bushing, being attached to the lower end of the transmission shaft and loosely fitting with the fixing plate bushing; and a nut, engaging with the lower end of the transmission shaft;

whereby, the transmission shaft, the shaft hub, the fan blade part, and the fixing plate bushing and the shaft bushing can be assembled coaxially with being firmly supported by the shaft hub, the fixing plate and the nut such that the transmission shaft can perform a more steady rotation.

* * * * *